HIGH VOLTAGE SWITCH FOR A COLOR TELEVISION RECEIVER

Filed Nov. 3, 1966 Sheet 1 of 4

INVENTOR
LAWRENCE K. M. TING

BY Brown & Mikulka and Richard L. Aitken
ATTORNEYS

INVENTOR
LAWRENCE K.M. TING

BY Brown & Mikulka and
Richard L. Aitken
ATTORNEYS

INVENTOR
LAWRENCE K.M. TING

BY Brown & Mikulka and Richard L. Aitken
ATTORNEYS

INVENTOR
LAWRENCE K. M. TING

BY Brown & Mikulka and Richard L. Aitken
ATTORNEYS

United States Patent Office 3,447,028

Patented May 27, 1969

3,447,028

SWITCH FOR A COLOR TELEVISION RECEIVER

Lawrence K. M. Ting, Arlington, Mass., assignor to Polaroid Corporation, Cambridge, Mass., a corporation of Delaware Filed Nov. 3, 1966, Ser. No. 591,895
Int. Cl. H01j 29/52
U.S. Cl. 315—30 19 Claims

ABSTRACT OF THE DISCLOSURE

This specification discloses color television receivers of the type in which the multi-color images are produced by accelerating an electron beam to different velocities. Each of the receivers employs a high voltage switch for applying rectangular waveforms to the screen of the kinescope of the receiver in order to accelerate the electron beam to different velocities. Several different embodiments of the high voltage switch are disclosed. These high voltage switches generate the rectangular waveform from the horizontal sync pulses, which are selectively gated to the primary of a step up high voltage transformer. The output of the high voltage transformer is applied through a high voltage rectifier to the capacitive load provided by a conductive film on the screen of the kinescope. The application of the pulses to the primary of the high voltage transformer is controlled in a manner so the desired high voltage square wave is produced across the capacitive load.

This invention relates to color television receivers of the type in which the multicolored images are produced by accelerating an electron beam to the different velocities and more particularly to color television receivers with improved high voltage switches for producing the different values of electron beam acceleration.

In color television receivers in which different colors are produced by accelerating electrons to different velocities, the screen of the color picture tube may be formed in layers of two light emissive materials, each of which produces a different color when excited by an impinging electron. The electrons are accelerated to different velocities, which are selected so that the electrons will penetrate selectively to the different light emissive layers. The lower velocity electrons will penetrate only to the inner layer, nearest the cathode, and accordingly will excite only the inner light emissive layer. The higher velocity electrons will penetrate through to the outer layer so that both of the light emissive layers are excited.

This penetration type of color television receiver is particularly useful in producing color displays which take advantage of the phenomenon that a multicolored scene can be perceived even though the objects in the scene are represented by different combinations of intensities of monochromatic and achromatic light. For example, a scene of multicolored objects can be perceived in full color even though the objects are represented in the scene by different intensity combinations of red and white light. This phenomenon is described in an article entitled "The Retinex" by Edwin H. Land in the June 1964 issue of "American Scientist," pages 247–264.

The color television receivers of the present invention are of the penetration type and take advantage of the above described phenomenon of color perception. The present invention is directed particularly to improvements in the high voltage switches which produce the necessary high voltage square wave form used to accelerate the electron beam to the different velocities to produce images in different colors.

The high voltage square wave form is applied to an electrically conducting aluminum film which overlies the luminescent layers of the picture tube screen. The electrically conducting aluminum film represents a highly capacitive load to be driven by the square wave form. In accordance with the present invention, the high voltage square wave form is generated by means of the horizontal sync pulses, which are selectively gated to the primary of a step up high voltage transformer. The output of the high voltage transformer is applied through a high voltage rectifier to the capacitive load. The application of the pulses to the primary of the high voltage transformer is controlled in a manner so that the desired high voltage square wave is produced across the capacitive load. In one embodiment of the present invention, the frequency of the pulses applied to the primary is varied so as to obtain the desired square wave at the output. In other embodiments of the present invention, the pulses are selectively gated so as to produce the desired square wave output. In still other embodiments of the present invention, the amplitude of the applied pulses is selectively varied in alternate scannings of the field to produce the desired square wave.

Accordingly, an object of the present invention is to provide an improved color television receiver of the type in which multicolored images are produced by accelerating the electron beam to different velocities.

Another object of the present invention is to provide an improved high voltage switch for use in a color television receiver of the type in which multicolored images are produced by accelerating the electron beam to different velocities. A further object of the present invention is to provide a high voltage square wave which can be used to accelerate the electron beam of the color television picture tube to different velocities to produce multicolored images.

A still further object of the present invention is to provide a circuit for producing a high voltage square wave which can be used to drive a highly capacitive load.

Other objects and advantages of the present invention will become readily apparent as the following detailed description of the invention unfolds and when taken in conjunction with the drawings wherein.

Figures 1, 2:
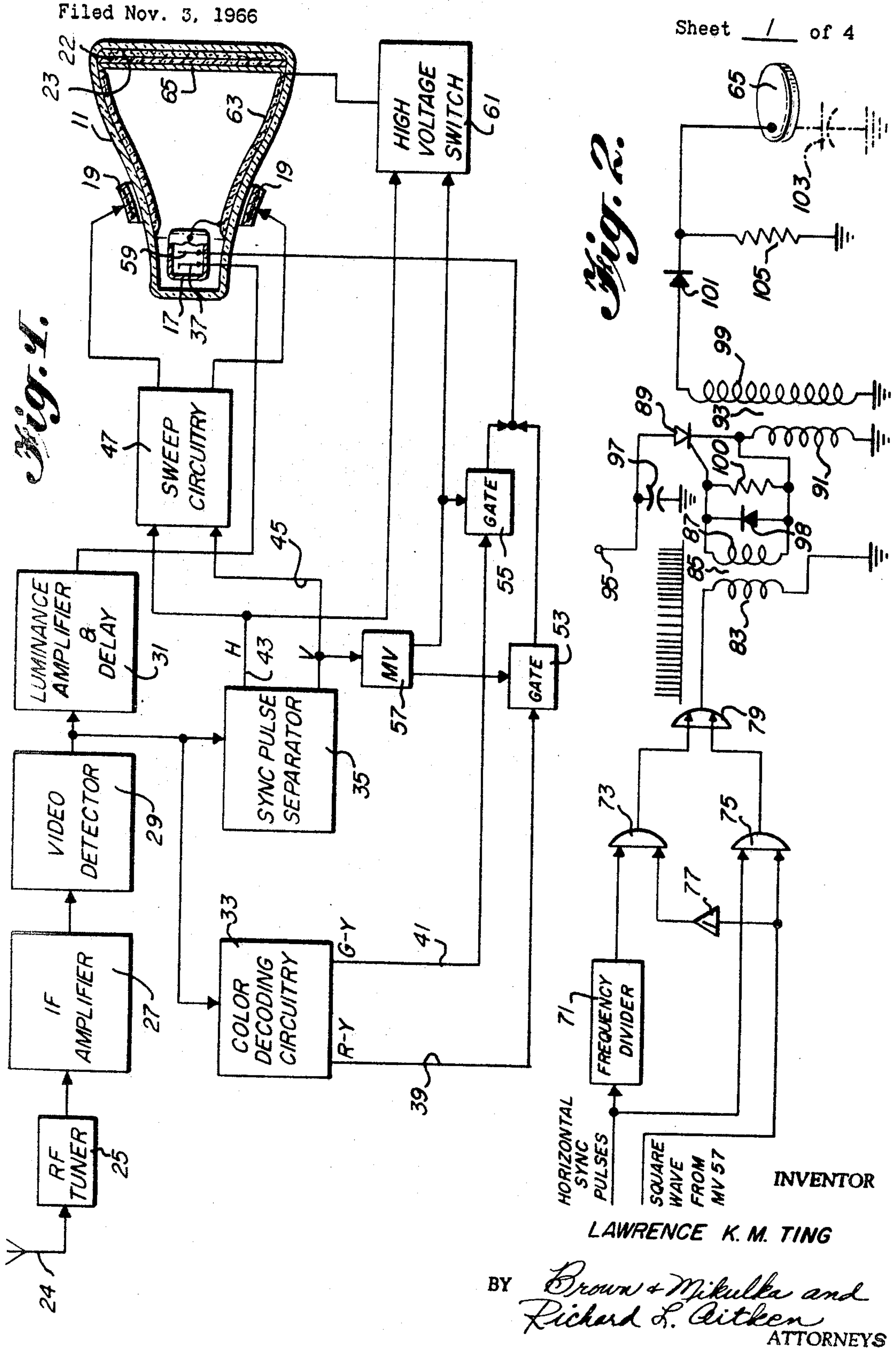
FIG. 1 is a block diagram of a color television receiver in which the present invention is incorporated.
FIG. 2 is a circuit diagram of one embodiment of the high voltage switch shown as a block in the receiver of FIG. 1.

As shown in FIG. 1, the color television receiver comprises a color television kinescope or picture tube 11. A single electron gun 17 is provided in the neck of the picture tube. Deflection coils 19 are provided to control the deflection of the electron beam produced by the electron gun to scan a conventional television raster on the screen of the picture tube 11. Two luminescent layers 22 and 23 are formed on the inside surface of the screen of the picture tube. The inner layer 22, which is the layer nearer the electron gun, is a luminescent phosphor which gives off red light when excited by an impinging electron. The outer layer 23 is a luminescent phosphor which gives off mixed green and blue light when excited by an impinging electron. The electron beam produced by the electron gun 17 is accelerated either to a velocity corresponding to 10 kilovolts or to a velocity corresponding to 15 kilovolts. When the electron beam is accelerated to a velocity corresponding to 10 kilovolts, it will penetrate only into the inner layer 22 so that only the inner layer 22 is excited and gives off red light. When the electron beam is accelerated to a velocity corresponding to 15 kilovolts, electrons will have enough energy to penetrate through the inner layer 22 and into the outer layer 23 so that both the layers 22 and 23 are excited and give off their characteristic light. Accordingly, white light will be emitted from the screen when the electron beam is accelerated to a velocity corresponding to 15 kilovolts.

The system of FIG. 1 is a field sequential system so that the electron beam is first caused to scan the entire field on the screen with the electrons having a velocity corresponding to 10 kilovolts and then is caused to scan the entire field with the electrons having a velocity corresponding to 15 kilovolts. The intensity of the electron beam is controlled in accordance with the red video in the detected television signal when the electron beam velocity corresponds to 10 kilovolts and is controlled in accordance with the green video when the electron beam velocity corresponds to 15 kilovolts. Accordingly, images will be produced on the screen in red light in accordance with the red video and images will be produced on the screen in white light in accordance with the green video. The red and white images will be produced alternately on the screen in successive scannings of the field by the electron beam. The alternate red and white images will combine to be perceived as a multicolored image by the viewer.

As shown in FIG. 1, an antenna 24 in the color television receiver intercepts the RF color television signal and applies it to an RF tuner 25. The RF color television signal includes an RF picture wave which is amplitude modulated with the composite color video signal, including a luminance signal and a color subcarrier amplitude and phase modulated with the color information, in accordance with present broadcasting standards. The RF signal also includes sound information, which is detected in a conventional manner, but which will not be described in the present application for purposes of simplification. The RF tuner converts the intercepted RF color television signal to IF and applies it to an IF amplifier 27 which amplifies the applied signal and applies it to a video detector 29. The video detector 29 converts the applied IF signal to the composite color video signal and applies the composite color video signal to a luminance amplifier and delay circuit 31, to color decoding circuitry 33, and to a sync pulse separator 35. The luminance amplifier and delay circuit 31 amplifies the applied signal and delays it to compensate for delays in the processing of the color signals and applies the resulting signal to the cathode 37 of the electron gun 17.

The color decoding circuitry 33 in response to the composite color video signal from the video detector 29 produces an R–Y video signal on a channel 39 and a G–Y video signal on a channel 41. The R–Y signal is red video minus the luminance or brightness and the G–Y signal is the green video minus the luminance or brightness. The sync pulse separator 35 separates the horizontal sync pulses from the applied composite signal and produces them on a channel 43 and separates out the vertical sync pulses from the applied composite signal and produces them on a channel 45. The horizontal and vertical sync pulses are applied to sweep circuitry 47, which generates the wave forms applied to the deflection coils 19 to cause the electron beam to scan a conventional television raster on the screen of the picture tube. The R–Y signal produced on channel 39 is applied to a gate 53 and the G–Y signal produced on channel 41 is applied to a gate 55. The vertical sync pulses produced on channel 45 are also applied to a multivibrator 57 and each vertical sync pulse produced on channel 45 causes the multivibrator 57 to switch to its opposite state. In one state, the multivibrator 57 enables the gate 53 and in its opposite state, the multivibrator 57 enables the gate 55. Since the vertical sync pulses are produced between successive scannings of the field on the screen of the picture tube 11, the gates 53 and 55 will be enabled alternately in successive scannings of the field. The outputs of the gates 53 and 55 are both applied to the control grid 59 of the electron gun 17. While the R–Y signal is applied to the grid 59, it coacts with the luminance signal applied to the cathode 37 to control the intensity of the electron beam in accordance with the red video, and while the G–Y signal is applied to the grid 59, it coacts with the luminance signal applied to the cathode 37 to control the intensity of the electron beam in accordance with the green video. Accordingly, the intensity of the electron beam is controlled alternately in accordance with the red video and the green video in successive scannings of the field by the electron beam.

The anode of the electron gun is electrically connected within the picture tube 11 to an electrically conducting coating 63 on the inner surface of the envelope of the picture tube. The electrically conducting coating 63 connects to an electrically conducting aluminum film 65 overlying the luminescent layers 22 and 23.

The signal voltage produced by the multivibrator 57 controlling the gate 55 is a square wave voltage having a frequency of one-half the frequency of the vertical sync pulses. This square wave is applied to a high voltage switch 61 which controls the potential applied to the aluminum film 65. The square wave voltage produced by the multivibrator 57 causes the high voltage switch 61 to alternately apply 10 kilovolts and 15 kilovolts to the aluminum film 65. The 10 and 15 kilovolts will be switched in synchronism with the applied square wave and these potentials will be applied in alternate scannings of the field by the electron beam. The 10 kilovolts are applied to the film 65 when the R–Y signal is applied to the control grid 59 and the 15 kilovolts are applied to the film 65 when the G–Y signal is applied to the grid 59. The 10 kilovolts applied to the film 65 will cause the electrons to strike the screen with a velocity sufficient to penetrate only into the inner luminescent layer 22 so that only the luminescent layer 22 is excited. Accordingly, only the inner luminescent layer 22 will be excited by the electron beam when the R–Y signal is applied to the grid 59. Thus, while the R–Y signal is applied to the grid 59, the image represented by the red video will be produced on the screen in red light. The 15 kilovolts applied by the high voltage switch 61 to the film 65 will cause the electrons in the electron beam to strike the screen with a velocity sufficient to penetrate through the inner luminescent layer 22 into the outer luminescent layer 23, so that both the inner and outer luminescent layers 22 and 23 are excited. Accordingly, both the layers 22 and 23 will be excited and will give off light while the G–Y video signal is applied to the control grid 59 and the image represented by the green video will be reproduced on the screen in white light while the G–Y signal is applied to the grid 59. Thus, red and white images are alternately produced on the screen and the red and white images correspond to the red and green video. The red and white images produced alternately on the screen will be perceived by the viewer as a multicolored representation of the transmitted picture.

The high voltage switch 61 also receives the horizontal sync pulses produced on channel 43 and utilizes these sync pulses in a manner to be described below to generate the high voltage square wave alternating between 10 and 15 kilovolts.

In the embodiment of the high voltage switch 61 illustrated in FIG. 2, the horizontal sync pulses are applied to a frequency divider 71 which produces output pulses at a frequency substantially lower than the frequency of the applied input pulses. The output pulses of the frequency divider are applied to a gate 73. The horizontal sync pulses in addition to being applied to the frequency divider 71 are also applied directly to a gate 75. The square wave from the multivibrator 57 is also applied to the gate 75 and enables the gate 75 when the gate 55 is enabled or in other words when the G–Y signal is applied to the control grid 59 of the electron gun 17. The square wave from the multivibrator 57 is also inverted by an inverter 77 and applied to the gate 73 so as to enable the gate 73 when the gate 53 is enabled or in other words when the R–Y signal is being applied to the grid 59 of the electron gun.

Gates 73 and 75 each will pass the applied pulses when enabled and the outputs from the gates 73 and 75 are applied through an OR gate 79 to the primary winding 83 of a transformer 85. Thus, when the G–Y signal is being produced at the grid 59 of the electron gun, pulses at the frequency of the horizontal sync pulses will be applied to the primary winding 83 of the transformer 85 and when the R–Y signal is being applied to the control grid 59, pulses at a frequency substantially lower than the horizontal sync frequency will be applied to the primary winding 83. The resulting pulse waveform is illustrated above the interconnection between the OR gate 79 and the primary winding 83.

The secondary winding 87 of the transformer winding 85 is connected between the gate and cathode of a silicon controlled rectifier 89. The cathode of the silicon controlled rectifier 89 is connected to ground through the primary winding 91 of a high voltage transformer 93. The anode of the silicon controlled rectifier 89 is connected to a positive voltage source of about 130 volts applied at a terminal 95 and is also connected through a capacitor 97 to ground.

Each time a pulse is applied to the primary winding 83, the resulting pulse induced in the secondary winding 87 of the transformer 85 will turn the silicon controlled rectifier 89 on for the length of the pulse. The silicon controlled rectifier 89 will then be turned off again at the end of the pulse by the ringing of the circuit comprising the winding 91 and the capacitor 97. Thus, each time a pulse is applied to the primary winding 83 of the transformer 85, a pulse will be applied to the primary winding 91 of the transformer 93. A diode 98 and a resistor 100 are connected in parallel with the secondary winding 87 to stabilize the voltage applied to the gate of the silicon controlled rectifier.

The transformer 93 is a step-up transformer and a pulse of over 15 kilovolts will be induced in its secondary winding 99 in response to each pulse applied to the primary winding 91. The secondary winding 99 is connected so that in response to each pulse applied to the primary winding 91, it will produce a positive pulse which is applied through a high voltage rectifier 101 to the aluminum film 65 of the picture tube 11. The aluminum film 65 represents a highly capacitive load, which is shown in FIG. 2 as a capacitance 103. A five megohm resistor 105 is connected in parallel with the capacitive load 103.

When the G–Y signal is being applied to the control grid of the electron gun 17, high voltage pulses will be applied to the capacitance 103 through the rectifier 101 at the frequency of the horizontal sync pulses. The capacitance 103 will accumulate the applied pulses while discharging through the resistor 105. The voltage across the capacitance 103 will rise to an equilibrium value of 15 kilovolts. When the R–Y signal is being applied to the control grid of the electron gun 17, pulses at a frequency substantially lower than the horizontal sync pulses will be applied through the high voltage rectifier 101 to the capacitance 103. Accordingly, the equilibrium voltage that will result across the capacitance 103 will be substantially lower and will be 10 kilovolts. Thus, a square wave will be applied to the aluminum film 65 produced across the capacitance 103 alternating between 15 kilovolts and 10 kilovolts. The value of the resistor 105 is selected so as to properly tune the rise and fall times of the square wave produced across the capacitance load.

Figures 3, 4:
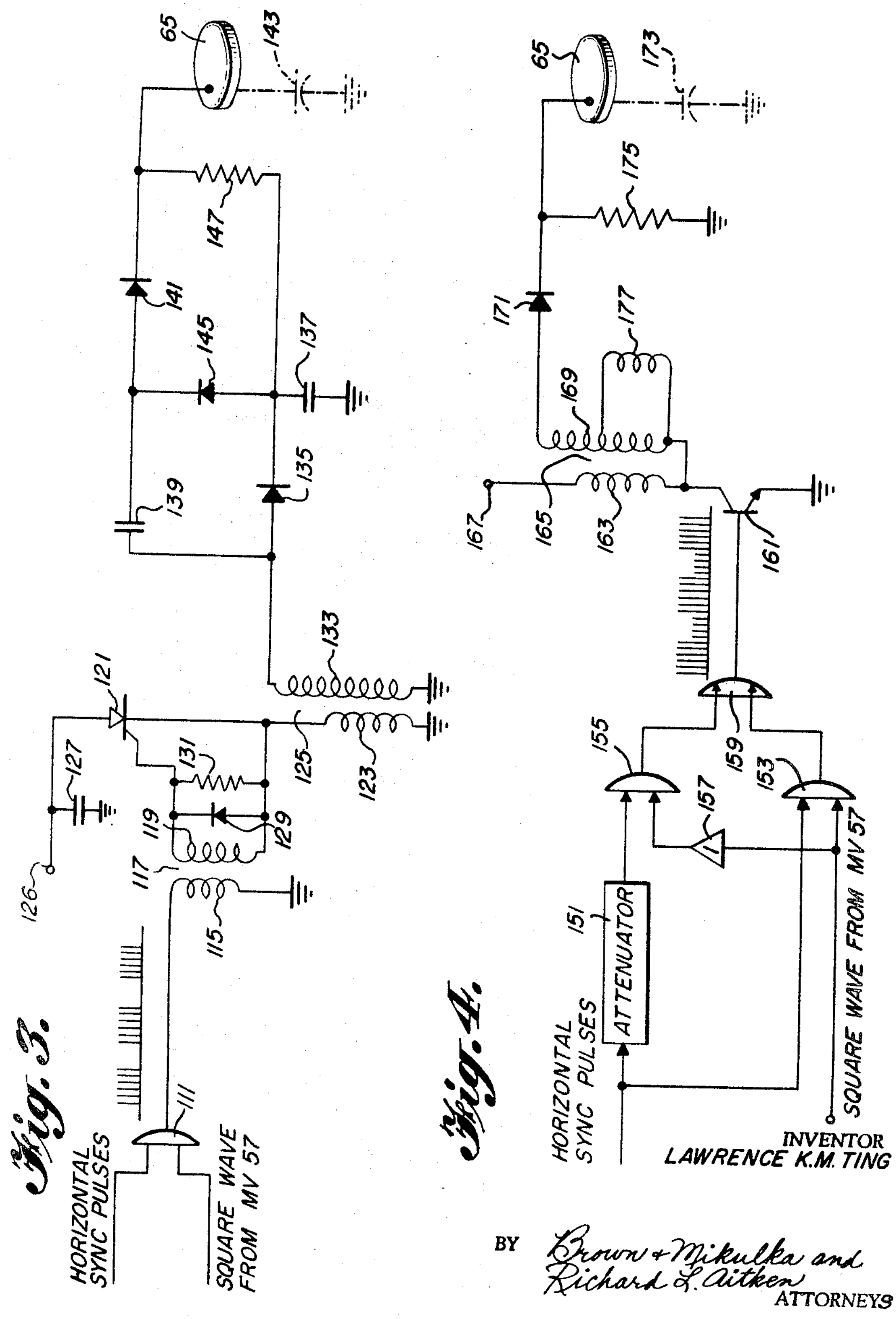
FIG. 3 is a circuit diagram of another embodiment of the high voltage switch of the receiver shown in FIG. 1.
FIG. 4 is a circuit diagram of still another embodiment of the high voltage switch of the receiver shown in FIG. 1.

In the embodiment of the high voltage switch shown in FIG. 3, the output square wave of the multivibrator 57 and the horizontal sync pulses are applied to a gate 111. The output square wave of the multivibrator 57 will enable the gate 111 to pass the applied horizontal sync pulses at the same time that the multivibrator 57 enables the gate 55. Accordingly, the horizontal sync pulses will be passed through the gate 111 only while the G–Y video signal is applied to the control grid of the electron gun 17. The resulting pulse waveform produced at the output of the gate 111 is illustrated thereabove. The pulses passing through the gate 111 are applied to the primary winding 115 of a transformer 117. The secondary winding 119 is connected between the gate and cathode of a silicon controlled rectifier 121. The cathode of the silicon controlled rectifier 121 is connected to ground through the primary winding 123 of a step-up transformer 125. The anode of the silicon controlled rectifier 121 is connected to a source of positive voltage of about 130 volts applied at a terminal 126 which is also connected to ground through a capacitor 127. Each pulse applied to the primary winding 115 of the transformer 117 will cause a pulse to be induced in the secondary winding 119 which will render the silicon controlled rectifier 121 conducting. The silicon controlled rectifier 121 will remain conducting for the duration of the applied pulse but will be rendered non-conductive at the termination of the applied pulse by the ringing of the circuit comprising the primary winding 123 and the capacitor 127. Thus, in response to each pulse applied to the primary winding 115, a pulse from the positive voltage source will be applied to the primary winding 123 of the step-up transformer 125. A diode 129 and a resistor 131 are connected in parallel with the secondary winding 119 to stabilize the voltage applied at the gate of the silicon controlled rectifier 121.

One side of the secondary winding 133 of the transformer 125 is connected to ground. Each time a pulse is applied to the primary winding 123 from the source of positive voltage at terminal 125, a high voltage positive pulse will be induced in the secondary winding 133, which positive pulse will be applied through a high voltage rectifier 135 to one side of a capacitor 137 of about one thousands picofarads. The high voltage pulses induced in the secondary winding 133 will be in excess of ten kilovolts. As a result of the pulses induced in the secondary winding 133, an equilibrium voltage of 10 kilovolts will be built up across the capacitor 137.

The pulses induced in the secondary winding 133 are also applied through a capacitor 139 and a high voltage rectifier 141 to the aluminum film 65. The aluminum film 65 represents a capacitive load which is shown in FIG. 3 as a capacitance 143. A high voltage rectifier 145 is connected from between the junction of the high voltage rectifier 135 and the capacitor 137 to the junction between the capacitor 139 and the high voltage rectifier 141. The high voltage rectifier 145 is poled so as to transmit the plus 10 kilovolts across the capacitor 137 to the junction between the capacitor 139 and the high voltage rectifier 141. A five megohm resistor is connected from the output lead connecting to the aluminum film 65 and the junction between the high voltage rectifier 135 and the capacitor 137.

Because of the gating provided by the gate 111, the high voltage pulses induced in the secondary winding 133 will be produced only while the G–Y signal is being applied to the control grid 59 of the electron gun. These pulses, which will be at the frequency of the horizontal sync pulses, will appear at the junction between the capacitor 139 and the high voltage rectifier 141 as high voltage pulses on top of the 10 kilovolt DC level applied to this junction by the high voltage rectifier 145. The wave form at this junction will be transmitted through the rectifier 141 to the aluminum film 65. During the intervals that the high voltage pulses are being produced, that is while the G–Y signal is being applied to the anode of the electron gun, the voltage across the capacitance 143 provided by the aluminum film will rise to an equilibrium value of 15 kilovolts due to the accumulation of the high voltage pulses by the capacitance 143. During the intervals in which the high voltage pulses are not being produced, that is while the R–Y signal is being applied to the grid of the electron gun, the voltage across the capacitance 143 will discharge through the resistor 147 to the equilibrium value of the voltage across the capacitor 137 of 10 kilovolts. Thus, a square wave form will be produced on the aluminum film 65 alternating between 10 and 15 kilovolts with the 15 kilovolts being produced while the G–Y signal is being applied to the control grid of the electron gun and the 10 kilovolts being produced while the R–Y signal is applied to the control grid of the electron gun. The value of the resistor 147 is selected so as to properly tune the rise and fall times of the square wave produced across the capacitance 143.

In the embodiment of the high voltage switch 61 shown in FIG. 4 the horizontal sync pulses are applied to an attenuator 151 and also to a gate 153. The horizontal sync pulses after being attenuated by the attenuator 151 are applied to a gate 155. The square wave from the multivibrator 57 is applied directly to the gate 153 to enable the gate 153 while the G–Y signal is applied to the grid of the electron gun 17 and is applied through an inverter 157 to the gate 155 to enable the gate 155 while the R–Y signal is applied to the control grid of the electron gun. The outputs of the gates 153 and 155 are applied through an OR gate 159 to the base of a NPN transistor 161.

The gate 153 when enabled will pass the horizontal sync pulses applied thereto and the gate 155 when enabled will pass the attenuated horizontal sync pulses applied thereto. As a result, a train of pulses will be applied to the base of the transistor 161 having a relatively large amplitude while the G–Y signal is being applied to the control grid of the electron gun and having a relatively small amplitude when the R–Y signal is being applied to the control grid of the electron gun. The pulse waveform resulting at the output of the OR gate 159 is shown above the interconnection between the OR gate 159 and the transistor 161.

The emitter of the transistor 161 is connected to ground and the collector of the transistor 161 is connected through the primary winding 163 of a step-up transformer 165 to a source of positive voltage of about 130 volts applied at a terminal 167. The relatively low amplitude pulses applied to the base of the transistor 161 will cause the transistor 161 to conduct with relatively low conductivity resulting in relatively low amplitude pulses being applied to the primary winding 163 of the transformer 165. The high amplitude pulses applied to the base of the transistor 161 will cause the transistor 161 to conduct with relatively high conductivity and thus cause relatively high amplitude pulses to be applied to the primary winding 163. One side of the secondary winding 169 of the transformer 165 is connected to the collector of the transistor 161 and the other side of the secondary winding 169 is connected through a high voltage rectifier 171 to the aluminum film 65. The aluminum film is a capacitive load on the circuit and the capacitive load is represented in FIG. 4 as capacitance 173. A five megohm resistor 175 is connected in parallel with the capacitance 173.

The pulses applied to the primary winding of the transformer 165 will cause pulses to be induced in the secondary winding 169 of several kilovolts. The higher amplitude pulses applied to the primary winding 163 will cause the pulses to be induced in the secondary winding 169 in excess of 15 kilovolts and the lower amplitude pulses applied to the primary winding 163 will cause the pulses to be induced in the secondary winding 169 in excess of 10 kilovolts. The pulses induced in the winding 169 are of a polarity to pass through the high voltage rectifier 171 so that they are accumulated on the capacitance 173 of the load. While the higher voltage pulses in excess of 15 kilovolts are being induced in the secondary 169, the voltage across the capacitance 173 will reach an equilibrium value of 15 kilovolts. While the lower amplitude pulses are being induced in the secondary winding 169, the voltage across the capacitance 173 will reach an equilibrium value of 10 kilovolts. Accordingly, a square wave voltage is produced on the aluminum film 65 alternating between 10 and 15 kilovolts. As a result, 15 kilovolts will be applied to the aluminum film while the G–Y signal is being applied to the grid of the electron gun, and 10 kilovolts will be applied to the aluminum film while the R–Y signal is applied to the control grid of the electron gun. The value of the resistor 175 is selected so as to properly tune the rise and fall times of the square wave produced across the capacitance 173.

Because in the system illustrated in FIG. 1 the electron beam is accelerated to different velocities through the deflection field generated by the deflection coils 19, the deflection of the electron beam when the image is being produced in white light will be less for a given deflection field than the deflection will be when the image is being produced in red light. Accordingly, the signals applied to the deflection coils 19 by the sweep circuitry 47 must be adjusted so that the red and white images coincide. A system for providing this adjustment is disclosed in the copending application Ser. No. 525,218, entitled Color Television System, invented by Zane M. Farmer, filed Feb. 4, 1966, and owned by the assignee of the present application. The system disclosed in the above identified copending application achieves the registration of the images by reducing the amplitude of the deflection signals applied by the sweep circuitry to the deflection coils while the image is being produced in red light relative to the deflection signals applied to deflection coils while the image is being produced in white light.

The circuit of FIG. 4 can be used to apply the deflection signals to the horizontal deflection coil or yoke and also to automatically provide the adjustment in the amplitude of the deflection signals applied to the horizontal deflection coil to bring about the proper registration of the red and white images on the screen of the picture tube 11. In the circuit of FIG. 4 this is accomplished by connecting the horizontal deflection coil across a portion of the secondary winding 169 of the transformer 165 as is illustrated in FIG. 4, in which the horizontal deflection coil is designated by the reference number 177. The pulses induced in the secondary winding 169 will be applied to the coil 177 and will have a greater amplitude while the white image is being produced on the screen than they have while the red image is being produced on the screen. The induced pulses applied to the horizontal deflection coil 177 results in a sawtooth current waveform flowing through the horizontal deflection coil. The amplitude of this sawtooth will vary in amplitude so that the deflection of the electron beam in the horizontal direction is the same when 15 kilovolts is being applied to the aluminum film 65 as it is when the 10 kilovolts is being applied to the aluminum film. The compensation of the deflection signals applied to the vertical deflection coil is provided in the same manner as in the above mentioned copending application.

Figure 5:
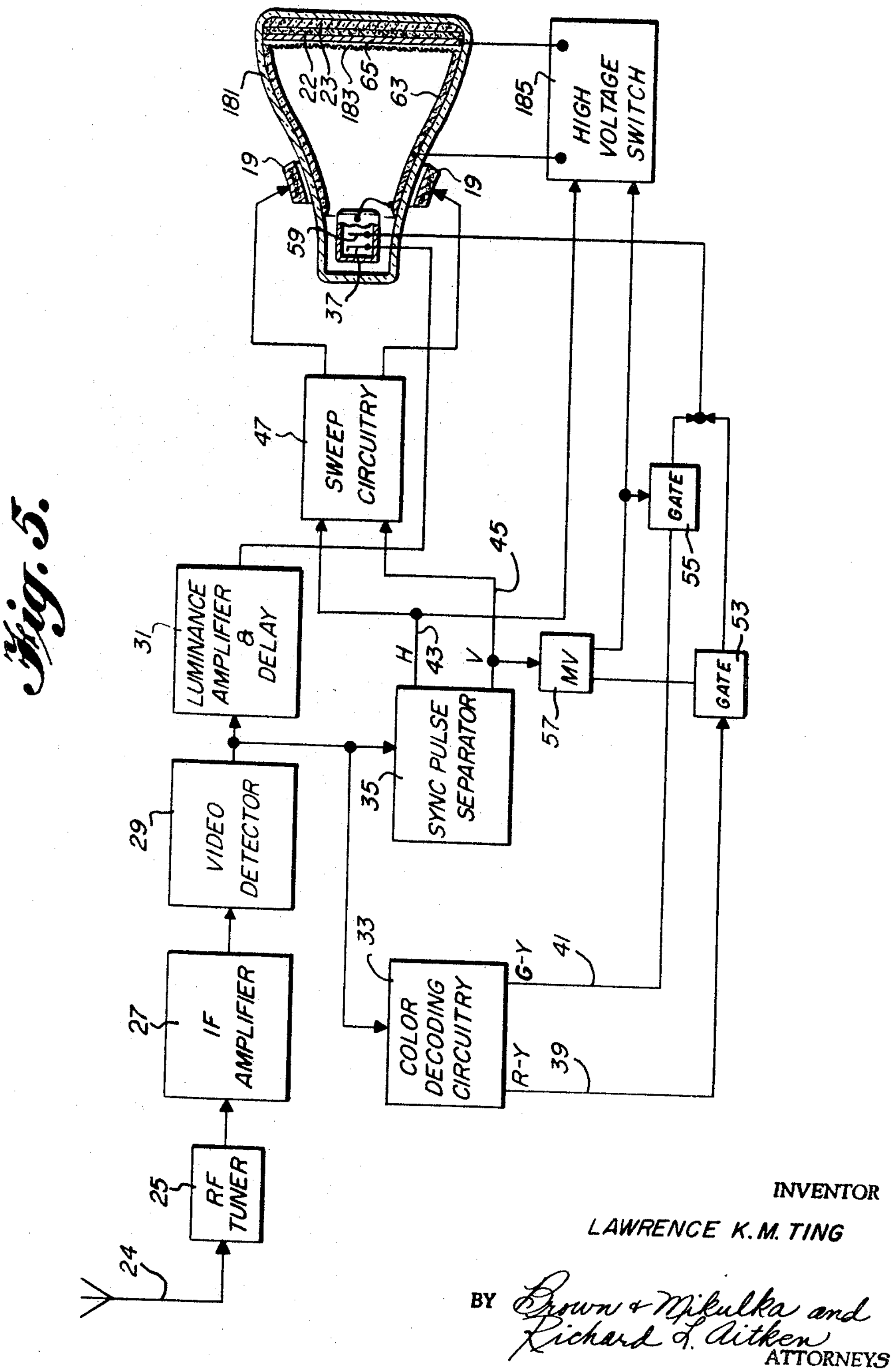
FIG. 5 is a block diagram of a slightly different embodiment of the color television receiver incorporating the present invention.

The receiver illustrated in FIG. 5 is similar to that illustrated in FIG. 1, but differs from the system illustrated in FIG. 1 in that it uses a different form of picture tube which is designated by the reference number 181. The picture tube 181 does not require the deflection field to be compensated to bring about registration of the red and white images. As in the picture tube 11, the screen of the picture tube 181 comprises two luminescent phosphor layers 22 and 23. The inner luminescent layer 22 will give off red light when excited by an impinging electron and the outer luminescent layer 23 will give off mixed green and blue light when excited by an impinging electron, so that, as in the picture tube 11, a white image can be produced by higher velocity electrons and a red image can be produced by lower velocity electrons. Also like the picture tube 11, the picture tube 181 has an aluminum film 65 overlying the luminescent layers 22 and 23, and the inner conical surface of the glass envelope of the picture tube 181 is coated with an electrically conducting coating 63. However, in the picture tube 181, the electrically conducting coating 63 is insulated from the aluminum film 65. As in the picture tube 11, the anode of the electron gun 17 of the picture tube 181 is connected to the electrically conducting coating 63. Near the screen of the picture tube 181 a fine wire mesh 183 is positioned parallel to the screen of the picture tube and separated by a small distance from the aluminum film 65. The wire mesh 183 is electrically connected to the electrically conducting coating 63 and is insulated from the film 65. The wire mesh 183 is coextensive with the screen of the picture tube.

The modified picture tube 181 requires a modified high voltage switch which in FIG. 5 is designated by the reference number 185. The high voltage switch 185 applies a constant potential of 10 kilovolts to the electrically conducting film 63 and therefore to the anode of the electron gun and to the wire mesh 183 and applies a square wave alternating between 10 and 20 kilovolts to the electrically conducting aluminum film 65. With this arrangement, the speed of the electrons in the electron beam does not vary until the electron beam passes through the wire mesh 183. If 20 kilovolts are applied to the aluminum film 65, the electron beam upon passing through the wire mesh 183 will be further accelerated to a velocity sufficient to penetrate through the layer 22 to the layer 23 so that a white image will be produced on the screen in accordance with the video signal applied to the control grid of the electron gun. When 10 kilovolts are applied to the aluminum film 65, the electron beam after passing through the wire mesh 183 will not be further accelerated and will only penetrate into the luminescent layer 22. As a result, an image will be produced in red light in accordance with the video signal applied to the control grid of the electron gun. Because the velocity of the electron beam while passing through the deflection field is the same while both the red and white images are being produced, no compensation is needed for the deflection signals applied to the deflection coils to bring the images into registration.

The remainder of the system of FIG. 5 is the same as that of FIG. 1 and accordingly will not be described in detail. The reference numbers used for the components of the remainder of the system shown in FIG. 5 are the same as that in FIG. 1.

Figure 6:
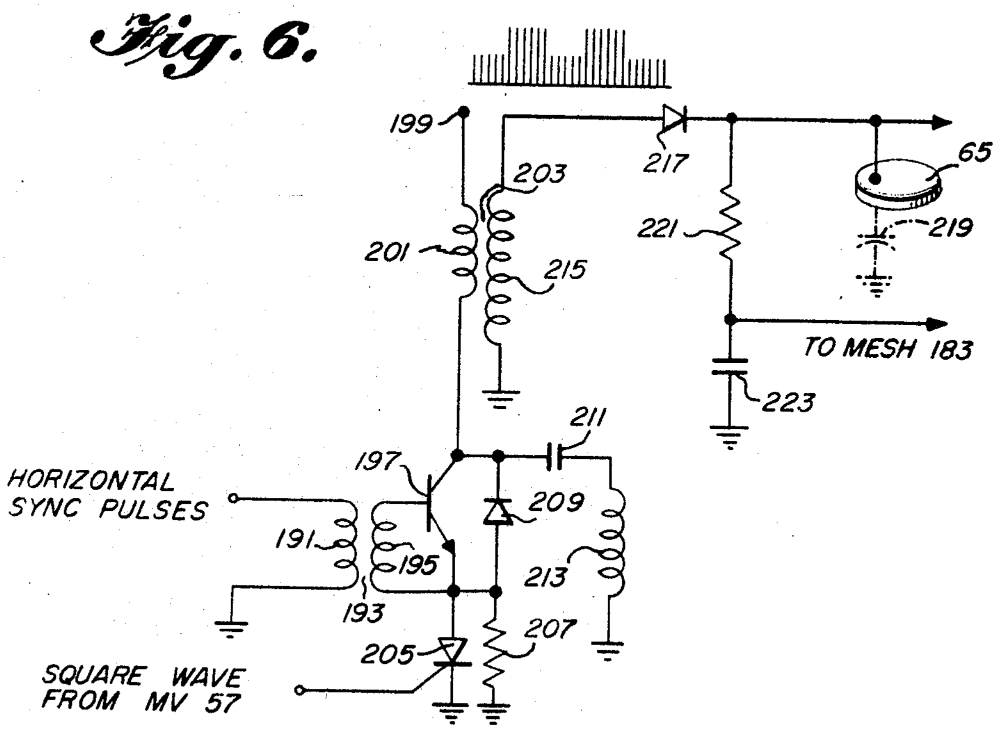
FIG. 6 is a circuit diagram of one embodiment of the high voltage switch shown as a block in the illustration of FIG. 5.

One embodiment of the high voltage switch 185 of the system in FIG. 5 is illustrated in FIG. 6. As shown in FIG. 6, the horizontal sync pulses are applied to the primary winding 191 of a transformer 193. The secondary 195 of the transformer 193 is connected between the base and the emitter of a NPN transistor 197. The collector of the transistor 197 is connected to a positive source of about 130 volts applied at a terminal 199 through the primary winding 201 of a step-up transformer 203. The emitter of the transistor 197 is connected to the anode of a silicon controlled rectifier 205, the cathode of which is connected to ground and the gate of which is connected to receive the square wave from the multivibrator 57. The emitter of the transistor 197 is also connected to ground through a 15 ohm resistor 207. A diode 209 is connected between the collector and the emitter of the transistor 197 for purposes of damping oscillations and preventing excessive voltage from being applied across the transistor 197. The collector of the transistor 197 is also connected to ground through a series circuit of a capacitor 211 and an inductor 213.

Each horizontal sync pulse applied to the transformer 193 will cause the transistor 197 to be rendered conductive. The square wave voltage applied to the gate of the silicon controlled rectifier 205 will cause the silicon controlled rectifier to be turned on while the R–Y signal is being applied to the control grid of the electron gun 17. The silicon controlled rectifier 205 will be turned off while the R–Y signal is being applied to the control grid of the electron gun 17. The turning off of the silicon controlled rectifier 205 will be effected by ringing of the RC circuit comprising the inductor 213, capacitor 211 and the primary winding 201 of the transformer 203. Each time the transistor 197 is rendered conductive by a horizontal sync pulse, current will flow from the positive source at terminal 199 through the transistor 197 to cause a pulse to be applied to the primary winding 201 of the transformer 203. If the SCR 205 is conductive, the pulse applied to the primary winding 201 will have a relatively high amplitude, but if the silicon controlled rectifier 205 is non-conductive, the pulse applied to the primary winding 201 will have a relatively low amplitude because the pulse will be attenuated by the resistor 207. When the silicon controlled rectifier 205 is conducting, the silicon controlled rectifier 205 shunts the resistor 207 and the emitter of the transistor 197 is in effect connected directly to ground. Thus, relatively high amplitude pulses will be applied to the primary winding 201 of the transformer 203 while the G–Y signal is being applied to the control grid of the electron gun and relatively low amplitude pulses will be applied to the primary winding 201 while the R–Y signal is being applied to the control grid of the electron gun.

One side of the secondary winding 215 of the transformer 203 is connected to ground and the other side of the secondary winding 215 is connected through a high voltage rectifier 217 to the aluminum film 65, which presents to the circuit a capacitive load represented in FIG. 6 by a capacitance 219 connected between the cathode of the high voltage rectifier 217 and ground. The cathode of the high voltage rectifier 217 is also connected through a 100 megohm resistor 221 to one side of a 0.001 microfarad capacitor 223, the other side of which is connected to ground. The junction between the resistor 221 and the capacitor 223 is connected to the electrically conducting coating 63 and hence to the anode of the electron gun and to the wire mesh 183. The relatively high and low amplitude pulses applied to the primary winding 201 will cause relatively high and low amplitude high voltage positive going pulses to be induced in the secondary winding 215. The resulting pulse waveform induced in the secondary winding 215 is illustrated above the connection between the secondary winding 215 and the high voltage rectifier 217. The higher amplitude pulses will be in excess of 20 kilovolts and the lower amplitude pulses will be in excess of 10 kilovolts. The positive going pulses after passing through the high voltage rectifier 217 will be accumulated on the capacitor 223 resulting in a substantially constant voltage of 10 kilovolts being produced across the capacitor 223. Because of the size of the capacitor 223, the variation in the amplitude of the high voltage pulses will not significantly change the voltage across the capacitor 223. The high voltage pulses will also be accumulated on the capacitance 219 presented by the aluminum film 65. Because this capacitance is only 100 picofarads, the voltage across this capacitance will vary with the amplitude of the applied pulses and will reach a voltage of 20 kilovolts when the higher amplitude pulses are passing through the high voltage rectifier 217 and will drop to a voltage of 10 kilovolts when the lower amplitude pulses are passing through the high voltage rectifier 217. In this manner a square wave is generated and applied to the aluminum film 65 varying between 20 and 10 kilovolts with the 20 kilovolts being applied to the aluminum film while the G–Y signal is being applied to the grid of the electron gun and the 10 kilovolts being applied to the aluminum film while the R–Y signal is being applied to the grid of the electron gun.

The circuit of FIG. 6 can also be used in the receiver of FIG. 1, in which case no connection will be provided to the picture tube from the junction between the capacitor 223 and the resistor 221. If the circuit of FIG. 6 is used in the system of FIG. 1, the inductance 213 could be the horizontal deflection coil so that the circuit of FIG. 6 would provide the deflection signals to the horizontal deflection coil. The amplitude of the deflection signals would vary with the square wave applied from the multivibrator 57 to provide the necessary compensation of the deflection produced by the horizontal deflection coil.

Figure 7:
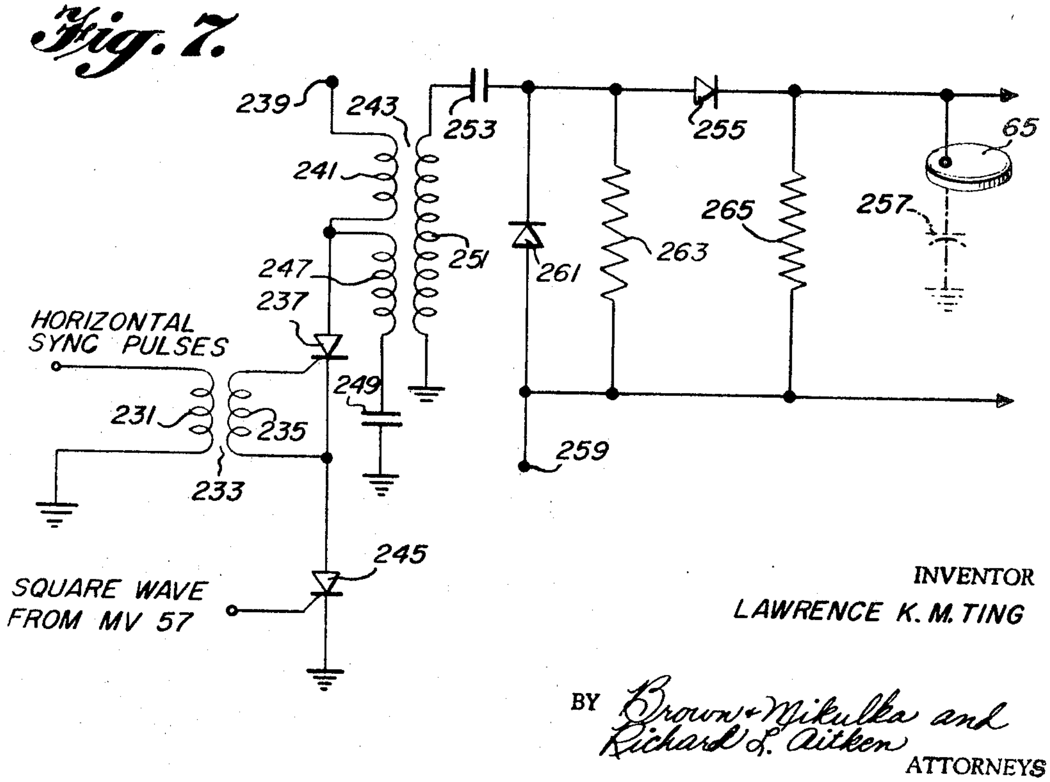
FIG. 7 is a circuit diagram of a different embodiment of the high voltage switch of the receiver shown in FIG. 5.

In the embodiment of the high voltage switch 185 shown in FIG. 7, the horizontal sync pulses are applied to the primary winding 231 of a transformer 233. The secondary winding 235 of the transformer 233 is connected between the gate and cathode of a silicon controlled rectifier 237. The anode of the silicon controlled rectifier 237 is connected to a positive source of 130 volts applied at a terminal 239 through a primary winding 241 of a transformer 243. The cathode of the silicon controlled rectifier 237 is connected to the anode of a silicon controlled rectifier 245, the cathode of which is connected to ground. The square wave voltage from the multivibrator 57 is applied to the gate of the silicon controlled rectifier 245. A second primary winding 247 of the transformer 243 is connected in series with a capacitor 249 between the anode of the silicon controlled rectifier 237 and ground.

Each horizontal sync pulse applied to the transformer 233 will render the silicon controlled rectifier 237 conductive. The square wave applied to the gate of the silicon controlled rectifier 245 will render the silicon controlled rectifier 245 conductive while the G–Y signal is applied to the control grid of the electron gun 17 of the picture tube 181. While the R–Y signal is applied to the control grid, the silicon controlled rectifier 245 will not be conductive. The silicon controlled rectifier 245 is switched to its non-conductive condition by the ringing of the RC circuit comprising the capacitance 249 and the primary windings 241 and 247 of the transformer 243. Similarly, the silicon controlled rectifier 237 is rendered non-conductive during the periods when the silicon controlled rectifier 245 is conductive at the termination of each horizontal sync pulse by the ringing of this circuit. During periods when the silicon controlled rectifier 245 is non-conductive, no current will flow through the silicon controlled rectifier 237 so it will return automatically to its non-conductive state at the termination of each horizontal sync pulse.

The capacitor 249 will be charged up to an equilibrium voltage of about 130 volts from the voltage applied at the terminal 239. Each time that both of the silicon controlled rectifiers 237 and 245 are rendered conductive, current will flow from the positive source at terminal 239 through the primary winding 241 and from the capacitor 249 through the primary winding 247 and then through the silicon controlled rectifiers 237 and 245 to ground. Thus, pulses will be applied to both the primary windings 241 and 247 each time a horizontal sync pulse is applied to the transformer 233 while the G–Y signal is applied to the control grid of the electron gun 17. No pulses will be applied to the primary windings 241 and 247 while the R–Y signal is applied to the control grid of the electron gun as the silicon controlled rectifier 245 will be non-conductive. The polarities of the primary windings 241 and 247 are such that the pulses applied to the windings 241 and 247 induce pulses in the secondary winding 251 of the transformer 243 in the same direction. One side of the secondary winding 251 is connected to ground and the other side of the secondary winding 251 is connected through a 100 picofarad capacitor 253 and then through a high voltage rectifier 255 to the aluminum film 65 of the picture tube 181. The aluminum film presents to the circuit a capacitive load, which is shown in FIG. 7 as a capacitance 257 connected between the cathode of the rectifier 255 and ground. A separate high voltage source of 10 kilovolts applied at a terminal 259 is connected through a high voltage rectifier 261 to the junction between the capacitor 253 and the rectifier 255. An eight megohm resistor 263 is connected in parallel with the rectifier 261 and a four megohm resistor 265 is connected from the cathode of the rectifier 255 to the 10 kilovolt source applied at terminal 259. The 10 kilovolt supply at terminal 259 is also connected directly to the wire mesh 183.

The 10 kilovolts at terminal 259 are applied by the high voltage rectifier 261 to the junction between the capacitor 253 and the high voltage rectifier 255 and through the high voltage rectifier 255 to the aluminum film 65. Each time a horizontal sync pulse is applied to the transformer 233 while the silicon controlled rectifier 245 is conducting, causing pulses to be applied to the primary windings 241 and 247 simultaneously, a positive high voltage pulse will be induced in the secondary winding 251 and will pass through the capacitor 253 to the rectifier 255. At the junction between the capacitor 253 and the rectifier 255, the high voltage pulse will be produced on top of the 10 kilovolts DC applied to this junction from the source at terminal 259. The high voltage pulses will pass through the rectifier 255 and be accumulated on the capacitance 257 presented by the aluminum film 65. As a result, while the high voltage pulses are being applied to the capacitance 257, the voltage across the capacitance 257 will rise to 20 kilovolts and while the high voltage pulses are not being applied to the capacitance 257, the voltage across the capacitance 257 will drop back down to the 10 kilovolts supplied by the high voltage source 259. As a result, a square wave will be produced on the aluminum film 65 alternating between 10 and 20 kilovolts with the 20 kilovolts being applied while the high voltage pulses are being induced in the secondary winding 251 and the 10 kilovolts being applied between these periods. The value of the resistor 265 is selected to properly tune the rise and fall times of the square wave. Thus, 20 kilovolts will be applied to the aluminum film while the G–Y signal is applied to the control grid of the electron gun and 10 kilovolts will be applied to the aluminum film while the R–Y signal is applied to the contral grid of the electron gun.

The above description is of preferred embodiments of the invention and many modifications may be made thereto without departing from the spirit and scope of the invention which is defined in the appended claims.

What is claimed is:

1. In a color television receiver of the type having a picture tube which produces an image in a first color when a first level of high voltage is applied to a high voltage input thereof and produces an image of a second color when a second high voltage level is applied to said high voltage input, said high voltage input presenting a capacitive load; a step up high voltage transformer, a high voltage rectifier connected to pass unipolar high voltage pulses induced in the secondary winding of said transformer to said high voltage input, an impedance connected to said high voltage input to provide a discharge path for the charge accumulated by said capacitive load, means to apply pulses to the primary winding of said transformer at a frequency such that the resulting pulses induced in said secondary winding are accumulated on said capacitive load as a high DC voltage level, and modulating means to modulate the pulses applied to said primary winding in a manner so that the voltage level accumulated across said capacitive load is a rectangular wave rising and falling between said first and second DC levels at a frequency substantially lower than the frequency of pulses applied to said primary winding.

2. The apparatus as recited in claim 1 wherein said impedance comprises a resistor.

3. The apparatus as recited in claim 1 wherein said pulses applied to said primary winding are at the frequency of and are derived from the horizontal sync pulses detected by said receiver.

4. The apparatus as recited in claim 1 wherein said modulating means comprises means to cyclically switch the frequency of the pulses applied to said primary winding between a first frequency and a second frequency.

5. The apparatus as recited in claim 1 wherein said modulating means comprises means to cyclically interrupt the application of said pulses to said primary winding.

6. The apparatus as recited in claim 5 wherein said means to apply pulses to said primary winding comprises an electron gate connected in series with said primary winding and said means to cyclically interrupt the application of pulses to said primary winding comprises a second electron gate connected in series with said first electron gate and said primary winding.

7. The apparatus as recited in claim 5 wherein there is provided a coupling capacitor between said secondary winding and said first mentioned high voltage rectifier, means to provide a source of high voltage, and a high voltage rectifier connected between said source of high voltage and the junction between said coupling capacitor and said first mentioned high voltage rectifier to supply high voltage from said source to said junction.

8. The apparatus as recited in claim 7 wherein said means to provide a source of high voltage comprises a charge accumulation capacitor and a third high voltage rectifier connected between said secondary winding and said charge accumulation capacitor to supply said charge accumulation capacitor with unipolar pulses induced in said secondary winding.

9. The apparatus as recited in claim 1 wherein said modulating means comprises means to cyclically switch the amplitude of said pulses between two levels.

10. The apparatus as recited in claim 9 wherein said means to apply pulses to said primary winding includes an electron gate connected in series with said primary winding and said means to cyclically switch the amplitude of the pulses applied to said primary winding includes an impedance connected in series with said electron gate and said primary winding and a second electron gate in series with said first electron gate and said primary winding and shunting said impedance.

11. A high voltage switch for generating a square wave across a capacitive load comprising a step up high voltage transformer, a high voltage rectifier connected to pass unipolar high voltage pulses induced in the secondary winding of said transformer to said capacitive load, an impedance connected to said capacitive load to provide a discharge path for the charge accumulated by said capacitive load, means to apply pulses to the primary winding of said transformer at a frequency such that the resulting pulses induced in said secondary winding are accumulated on said capacitive load as a high DC voltage level, and modulating means to modulate the pulses applied to said primary winding in a manner so that the voltage level accumulated across said capacitive load is a rectangular wave rising and falling between first and second DC levels at a frequency substantially lower than the frequency of the pulses applied to said primary winding.

12. The apparatus as recited in claim 11 wherein said impedance comprises a resistor.

13. The apparatus as recited in claim 11 wherein said modulating means comprises means to cyclically switch the frequency of the pulses applied to said primary winding between a first frequency and a second frequency.

14. The apparatus as recited in claim 11 wherein said modulating means comprises means to cyclically interrupt the application of said pulses to said primary winding.

15. The apparatus as recited in claim 14 wherein said means to apply pulses to said primary winding comprises an electron gate connected in series with said primary winding and said means to cyclically interrupt the application of pulses to said primary comprises a second electron gate connected in series with said first electron gate and said primary winding.

16. The apparatus as recited in claim 14 wherein there is provided a coupling capacitor between said secondary winding and said first mentioned high voltage rectifier, means to provide a source of high voltage, and a high voltage rectifier connected between said source of high voltage and the junction between said coupling capacitor and said first mentioned high voltage rectifier to supply high voltage from said source to said junction.

17. The apparatus as recited in claim 16 wherein said means to provide a source of high voltage comprises a charge accumulation capacitor and a third high voltage rectifier connected between said secondary winding and said charge accumulation capacitor to supply said charge accumulation capacitor with unipolar pulses induced in said secondary winding.

18. The apparatus as recited in claim 11 wherein said modulating means comprises means to cyclically switch the amplitude of said pulses between two levels.

19. The apparatus as recited in claim 18 wherein said means to apply pulses to said primary winding includes an electron gate connected in series with said primary winding and said means to cyclically switch the amplitude of the pulses applied to said primary winding includes an impedance connected in series with said electron gate and said primary winding and a second electron gate in series with said first electron gate and said primary winding and shunting said impedance.

References Cited

UNITED STATES PATENTS

| | | | |
|---|---|---|---|
| 2,843,796 | 7/1958 | Schade | 315—30 X |
| 3,138,722 | 6/1964 | Morgan | 307—305 X |
| 3,330,990 | 7/1967 | Guillette | 313—92 |
| 3,372,298 | 3/1968 | Merryman | 315—14 |

RODNEY D. BENNETT, Jr., *Primary Examiner.*

M. F. HUBLER, *Assistant Examiner.*